United States Patent
Lee (10) Patent No.: US 11,973,456 B2
(45) Date of Patent: Apr. 30, 2024

(54) MOTOR

(71) Applicant: LG INNOTEK CO., LTD., Seoul (KR)

(72) Inventor: Jin Seob Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 590 days.

(21) Appl. No.: 17/261,366

(22) PCT Filed: Jul. 18, 2019

(86) PCT No.: PCT/KR2019/008862
§ 371 (c)(1),
(2) Date: Jan. 19, 2021

(87) PCT Pub. No.: WO2020/017896
PCT Pub. Date: Jan. 23, 2020

(65) Prior Publication Data
US 2021/0281198 A1    Sep. 9, 2021

(30) Foreign Application Priority Data
Jul. 20, 2018   (KR) ........................ 10-2018-0084897

(51) Int. Cl.
*H02P 6/15*    (2016.01)
*H02K 29/08*   (2006.01)
*H02P 6/16*    (2016.01)

(52) U.S. Cl.
CPC ............ *H02P 6/153* (2016.02); *H02K 29/08* (2013.01); *H02P 6/16* (2013.01)

(58) Field of Classification Search
CPC combination set(s) only.
See application file for complete search history.

(56) References Cited

U.S. PATENT DOCUMENTS 4,622,499 A * 11/1986 Squires ................. H02P 6/06
                                                    318/400.04
5,299,277 A *  3/1994 Fujii .................. H02P 23/16
                                                    388/811
(Continued)

FOREIGN PATENT DOCUMENTS

JP    1-176367 A   7/1989
JP    8-102136 A   4/1996
(Continued)

OTHER PUBLICATIONS

Novak et al., "Implementation of a Novel Angular Hall Encoder for Field Oriented Control of High Speed and Experimental Motors", 17th International Conference on Mechatronics, Czech Technical University in Prague, Dec. 2016, pp. 1-7 (7 pages total).

*Primary Examiner* — Bickey Dhakal
(74) *Attorney, Agent, or Firm* — Birch, Stewart, Kolasch & Birch, LLP (57) ABSTRACT

According to the present invention, provided is a motor of which a controller generates an index signal at a second time point delayed from a first time point at which a pulse due to an index magnet is detected among pulses of a pulse width modulation (PWM) signal detected by a second Hall sensor, compares a second time point which is input in advance based on a constant speed condition of the motor and a detected second time point to obtain a first error, compares a duty value, which is input in advance based on the constant speed condition of the motor, of a PWM signal and a duty value of a detected PWM signal to obtain a second error, and controls a speed of the motor on basis of the first error and the second error.

8 Claims, 10 Drawing Sheets

(56) References Cited

U.S. PATENT DOCUMENTS

| | | | |
|---|---|---|---|
| 5,408,153 A | 4/1995 | Imai et al. | |
| 5,995,314 A * | 11/1999 | Furuki | H02P 6/16 |
| | | | 318/560 |
| 7,042,668 B1 * | 5/2006 | Emo | G11B 19/28 |
| | | | 318/560 |
| 2004/0245957 A1 | 12/2004 | Shibata et al. | |
| 2007/0145839 A1 | 6/2007 | Kimura et al. | |
| 2008/0012522 A1 * | 1/2008 | Wiegers | H02P 6/16 |
| | | | 318/638 |
| 2014/0055071 A1 | 2/2014 | Gu | |
| 2016/0207562 A1 | 7/2016 | Jang | |
| 2017/0054391 A1 * | 2/2017 | Qian | H02P 27/08 |
| 2018/0309396 A1 * | 10/2018 | Hardt | H02P 27/08 |
| 2021/0152055 A1 * | 5/2021 | Mizuo | G01D 5/24476 |

FOREIGN PATENT DOCUMENTS

| | | |
|---|---|---|
| JP | 2005-51855 A | 2/2005 |
| KR | 10-0171842 B1 | 5/1999 |
| KR | 10-1293082 B1 | 8/2013 |
| KR | 10-1343154 B1 | 12/2013 |
| KR | 10-1388854 B1 | 4/2014 |
| KR | 10-2016-0089907 A | 7/2016 |
| KR | 10-2017-0111162 A | 10/2017 |

\* cited by examiner

MOTOR

CROSS REFERENCE TO RELATED APPLICATIONS

This application is the National Phase of PCT International Application No. PCT/KR2019/008862, filed on Jul. 18, 2019, which claims priority under 35 U.S.C. 119(a) to Patent Application No. 10-2018-0084897, filed in the Republic of Korea on Jul. 20, 2018, all of which are hereby expressly incorporated by reference into the present application.

[Technical Field]

The present invention relates to a motor.

[Background Art]

A motor may include a rotor, a stator, and a shaft. The shaft is coupled to the rotor. The rotor may be disposed outside the stator. The rotor rotates due to an electromagnetic interaction between the rotor and the stator, and when the rotor rotates, the shaft is rotated.

The motor may be used as a driving source which rotates a sensor device (for example, light detection and ranging (LiDAR)). The shaft of the motor is connected to the sensor device. In this case, constant speed driving of the motor may be an important factor to secure the performance of the sensor device. The constant speed driving of the motor may be determined by detecting a position of the rotating rotor. In order to detect the position of the rotor, the motor may include a Hall sensor configured to detect a change in magnetic flux of a drive magnet disposed on the rotor. However, in a case in which a high constant speed condition is required for the motor using the sensor device, there is a problem of a limit in satisfying the constant speed condition of the motor only by detecting the change in the magnetic flux due to the general drive magnet.

[Technical Problem]

The present invention is directed to providing a motor satisfying a high constant speed driving condition.

Objectives to be solved through the present invention are not limited to the above-described objective, and other objectives which are not mentioned above will be clearly understood by those skilled in the art through the following specification.

[Technical Solution]

One aspect of the present invention provides a motor including a shaft, a yoke coupled to the shaft, a stator disposed between the shaft and the yoke, a first magnet and a second magnet disposed in the yoke, and a circuit board including a first Hall sensor disposed to correspond to the first magnet, a second Hall sensor disposed to correspond to the second magnet, and a controller, wherein the second magnet includes a plurality of divided magnets and an index magnet, the controller generates an index signal at a second time point delayed from a first time point at which a pulse due to the index magnet is detected among pulses of a pulse width modulation (PWM) signal detected by the second Hall sensor, compares a second time point which is input in advance based on a constant speed condition of the motor and a detected second time point to obtain a first error, compares a duty value, which is input in advance based on the constant speed condition of the motor, of a PWM signal and a duty value of a detected PWM signal to obtain a second error, and controls a speed of the motor on basis of the first error and the second error.

A width of the divided magnet and a width of the index magnet may be the same, each of the divided magnets and the index magnet may be formed in a combination of an N-pole and an S-pole, a width of the N-pole and a width of the S-pole may be the same in the divided magnet, and a width of the N-pole and a width of the S-pole may be different in the index magnet.

The first time point may correspond to a time point at which a falling edge of a pulse, at which a duty cycle is changed, of the PWM signal is detected.

The second time point may correspond to a time point at which a rising edge of the pulse of the index signal is detected while the PWM signal is in an off state.

The controller may detect and compare a rising edge of the pulse of the PWM signal to obtain the second error.

The controller may perform feedback control so that the second time point input in advance is the same as the detected second time point, and a duty value, which is input in advance, of the PWM signal is the same as a duty value of the detected PWM signal.

A width of the pulse of the PWM signal may be the same as a width of the pulse of the index signal.

A duty cycle may be 50% in a duty period except for a duty period in which the first time point is present among duty sections of the PWM signal, A duty cycle may be more than 50% in the duty period in which the first time point is present among the duty periods of the PWM signal.

[Advantageous Effects]

According to embodiments, an advantageous effect of satisfying a high constant speed driving condition is provided.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and one or more components of the embodiments may be selectively combined, substituted, and used to realize the technical spirit within the range of the technical spirit.

In addition, unless clearly and specifically defined otherwise by the context, all terms (including technical and scientific terms) used herein can be interpreted with a meaning generally understandable to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In descriptions of components of the present invention, terms such as "first," "second," "A," "B," "(a)," and "(b)" can be used.

The terms are only to distinguish one element from another element, and the essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element with still another element disposed therebetween.

In a case in which any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

Figure 1:
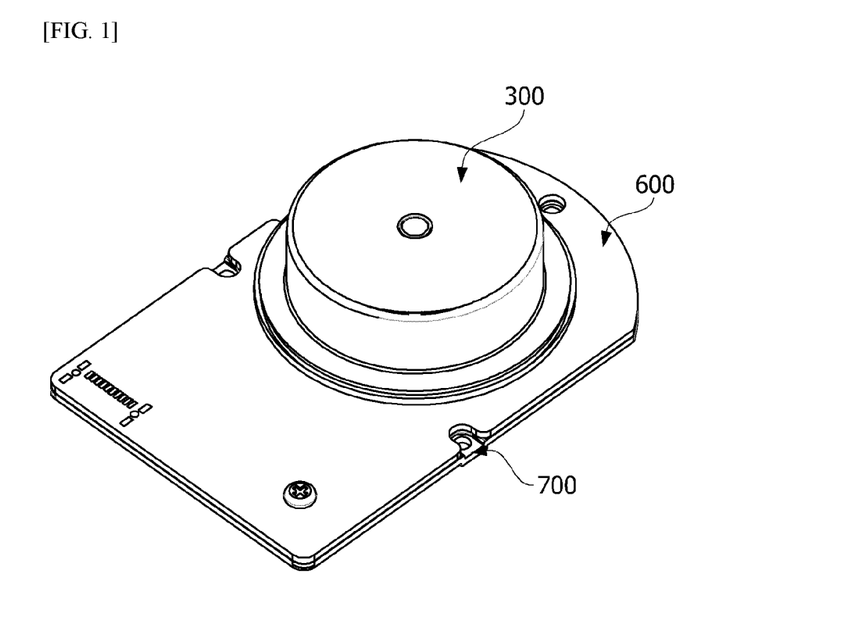
FIG. 1 is a perspective view illustrating a motor according to an embodiment.
Figure 2:
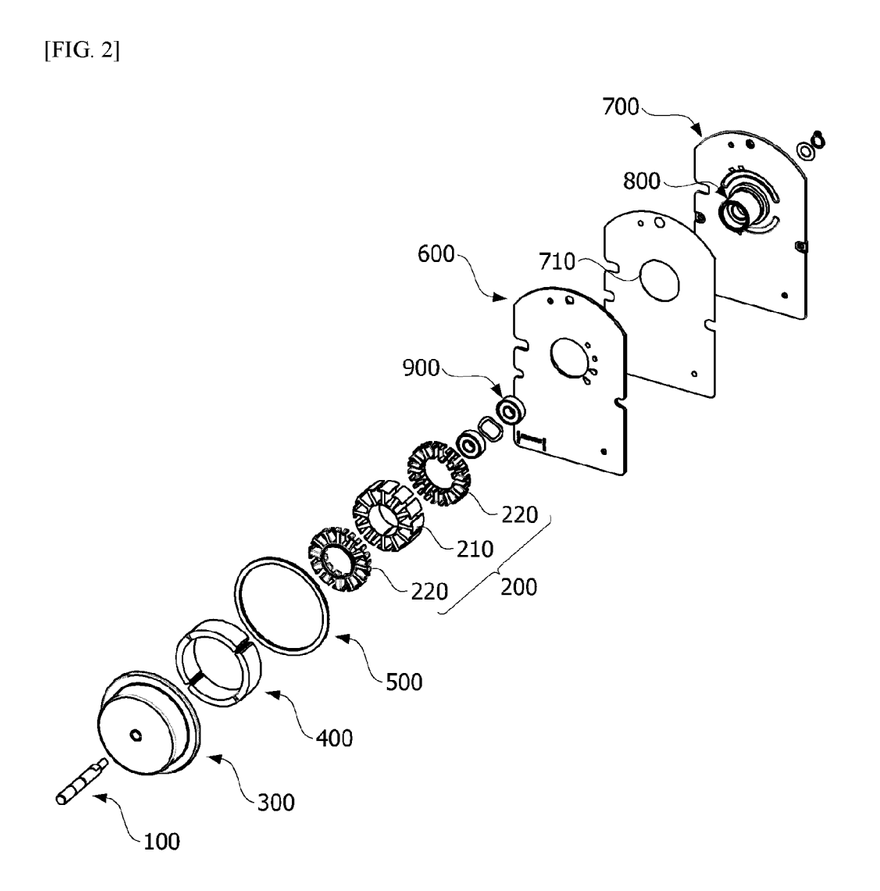
FIG. 2 is an exploded perspective view illustrating the motor illustrated in FIG. 1.
Figure 3:
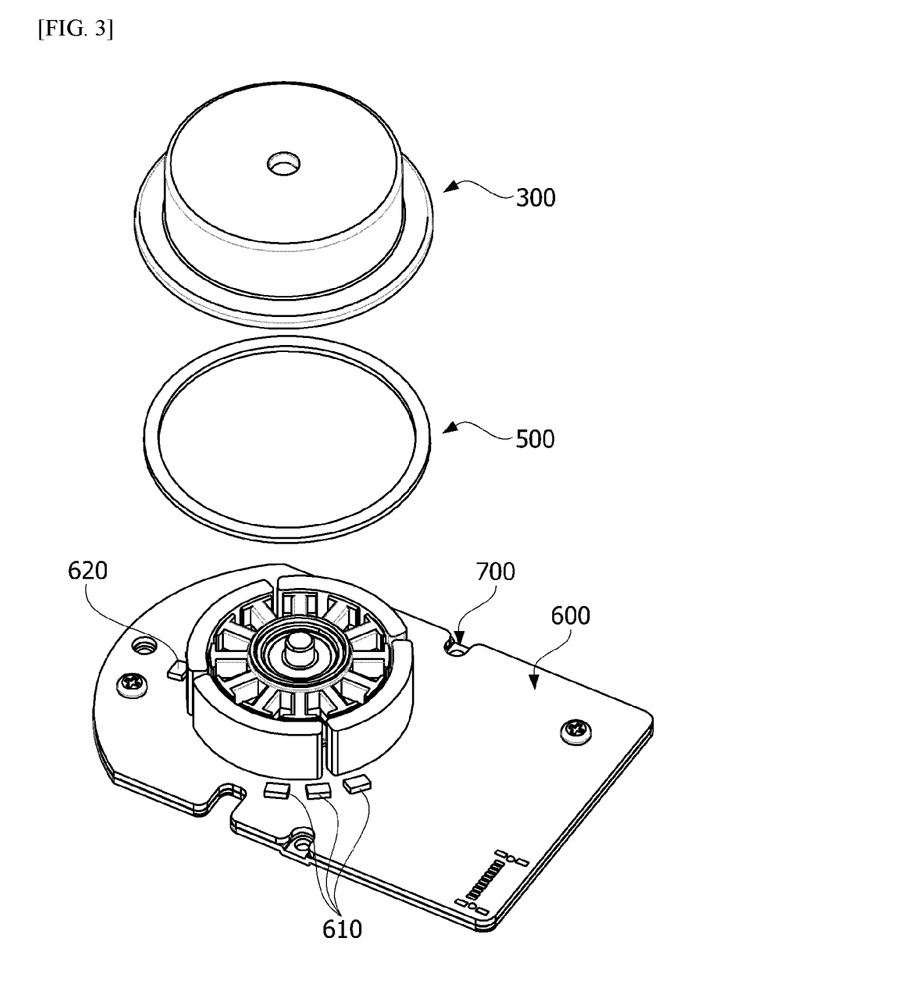
FIG. 3 is a view illustrating a yoke illustrated in FIG. 2.

FIG. 1 is a perspective view illustrating a motor according to an embodiment, FIG. 2 is an exploded perspective view illustrating the motor illustrated in FIG. 1, and FIG. 3 is a view illustrating a yoke illustrated in FIG. 2.

Referring to FIGS. 1 to 3, the motor according to the embodiment includes a shaft 100, a stator 200, a yoke 300, a first magnet 400, a second magnet 500, a circuit board 600, a base 700, a bearing housing 800, and bearings 900.

The shaft 100 serves as an axis of rotation of the yoke 300. The shaft 100 does not rotate and is fixed to the base 700. A front end of the shaft 100 may be connected to a sensor device configured to obtain distance information.

The stator 200 is disposed outside the shaft 100. The stator 200 includes a core 210. The core 210 includes a plurality of teeth. Coils are wound around the teeth. The stator 200 may include an insulator 220. The insulator 220 is coupled to the core 210.

The yoke 300 is disposed outside the stator 200. In addition, the yoke 300 is coupled to the shaft 100. The shaft 100 is positioned at a center of the yoke 300. The shaft 100 is also rotated due to the rotation of the yoke 300.

The first magnet 400 may be disposed inside the yoke 300. The first magnet 400 is for driving the yoke 300. The yoke 300 is rotated due to an electromagnetic interaction between the first magnet 400 and the coils wound around the stator 200. The first magnet 400 may be one annular member. Alternatively, the first magnet 400 may be a plurality of divided magnets which are combined.

The second magnet 500 may be disposed on a circumference of the yoke 300. The second magnet 500 is for detecting a position of the yoke 300 and may be used to implement constant speed driving of the motor by detecting one rotation of the motor. The second magnet 500 may have an annular shape. The second magnet 500 may be formed as a plurality of divided magnets.

The circuit board 600 is disposed under the stator 200. The circuit board 600 may include a first Hall sensor 610 and a second Hall sensor 620. The first Hall sensor 610 detects a magnetic flux of the first magnet 400. The second Hall sensor 620 detects a magnetic flux of the second magnet 500. The first Hall sensor 610 may be disposed under the first magnet 400. In addition, the second Hall sensor 620 may be disposed under the second magnet 500. A hole through which the bearing housing 800 passes may be disposed in the circuit board 600.

The base 700 is disposed under the circuit board 600. The circuit board 600 may be disposed on an upper surface of the base 700. An adhesive film 710 for coupling the base 700 and the circuit board 600 may be positioned between the base 700 and the circuit board 600. A hole through which the bearing housing 800 passes may be disposed in the base 700.

The bearing housing 800 includes the bearings 900 therein. The bearings 900 rotatably support the shaft 100. The bearings 900 may be disposed in upper and lower portions of the bearing housing 800.

The bearing housing 800 may include a first accommodation portion 810 and a second accommodation portion 820. The bearing 900 is disposed in the first accommodation portion 810. The bearing 900 is also disposed in the second accommodation portion 820. A partition wall 830 may be disposed between the first accommodation portion 810 and the second accommodation portion 820. The partition wall 830 (see FIG. 4) protrudes in the bearing housing 800 to divide the first accommodation portion 810 from the second accommodation portion 820 and supports outer rings of the bearings 900 in an axial direction.

Meanwhile, the bearing housing 800 is fixed to the base 700, and the bearing housing 800 is coupled to a center of the core 210 of the stator 200.

Figure 4:
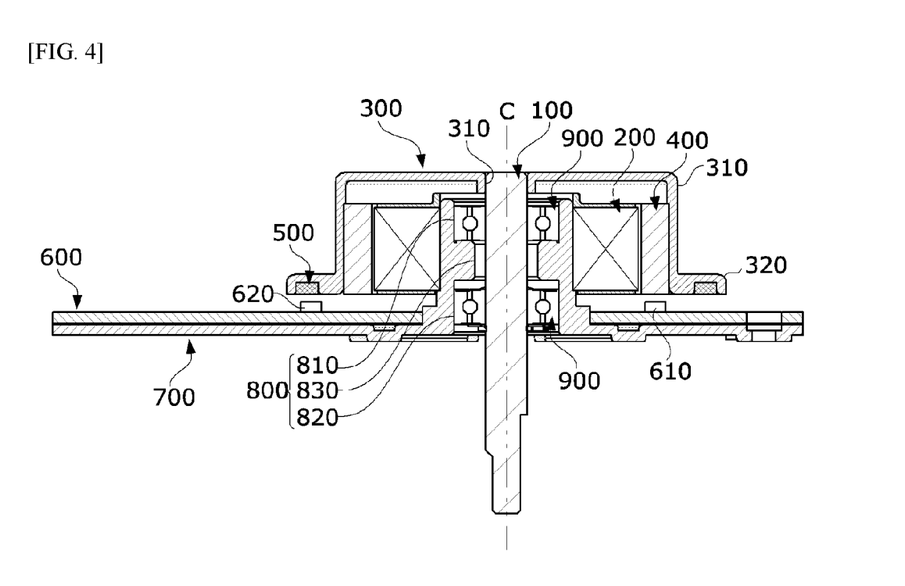
FIG. 4 is a side cross-sectional view illustrating the motor illustrated in FIG. 1.

FIG. 4 is a side cross-sectional view illustrating the motor illustrated in FIG. 1.

Referring to FIGS. 3 and 4, the yoke 300 includes a body 310 having a cylindrical shape and a flange 320. The body 310 has a shape of which an upper side is closed by an upper surface and a lower side is open. The flange 320 has a shape laterally extending from a lower end of the body 310. The shaft 100 is coupled to the upper surface of the body 310, and the shaft 100 and the yoke 300 rotate together. A hole 301 is disposed at a center of the upper surface of the body 310. An end portion of the shaft 100 may be press-fitted into and coupled to the hole 301.

The first magnet 400 is coupled to an inner circumferential surface of the body 310. In addition, the second magnet 500 is coupled to a lower surface of the flange 320.

Figure 5:
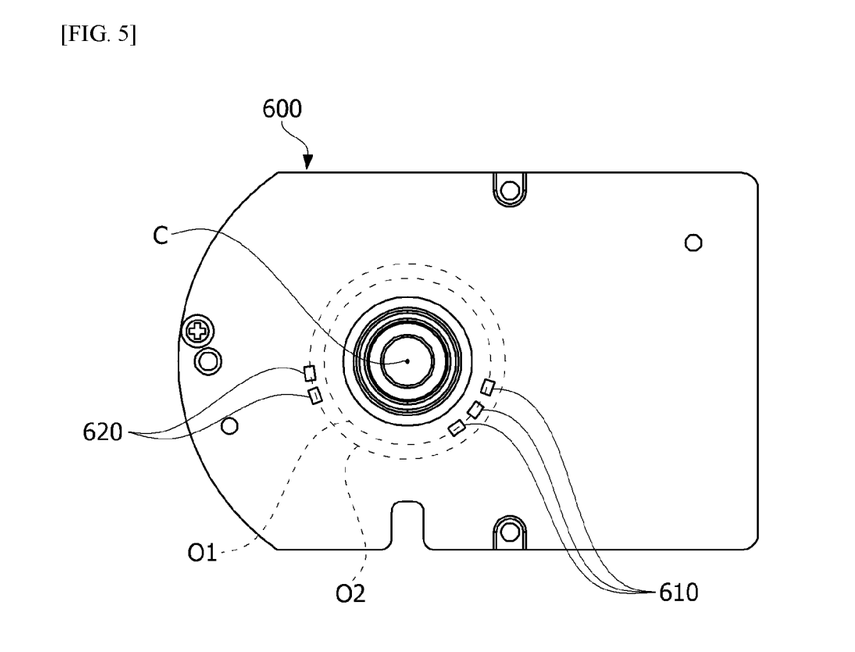
FIG. 5 is a view illustrating a circuit board including a first Hall sensor and a second Hall sensor.
Figure 6:
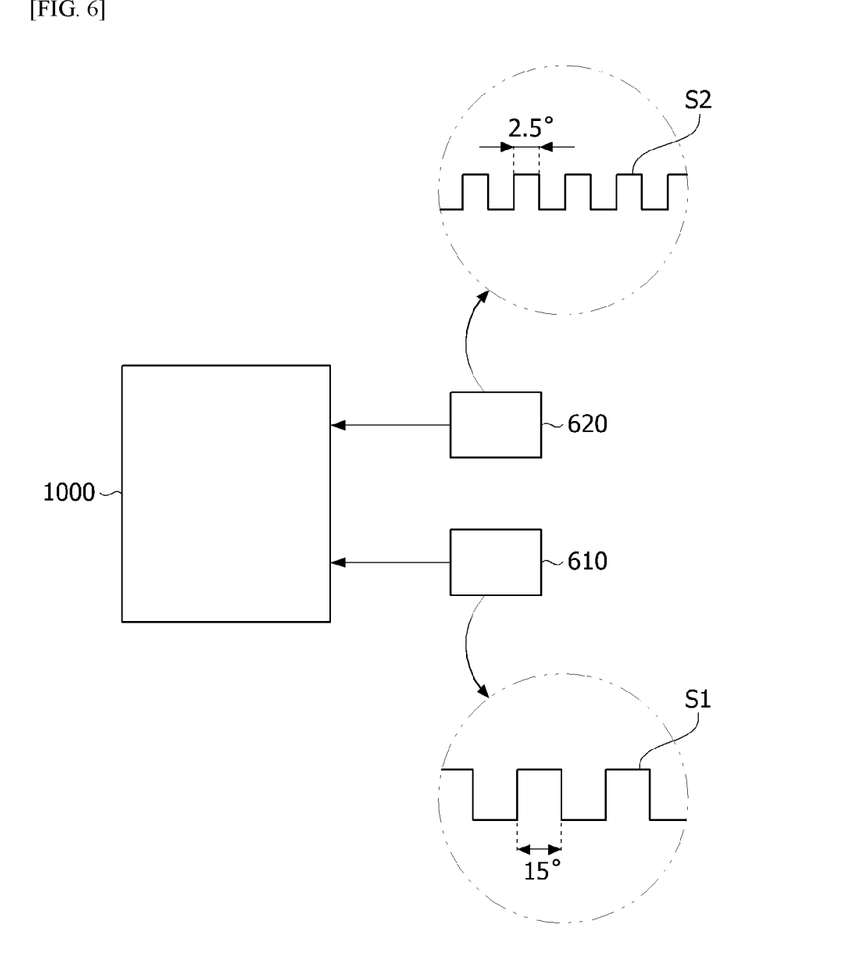
FIG. 6 is a view illustrating a controller, the first Hall sensor, and the second Hall sensor.

FIG. 5 is a view illustrating the circuit board including the first Hall sensor and the second Hall sensor, and FIG. 6 is a view illustrating a controller, the first Hall sensor, and the second Hall sensor.

Referring to FIGS. 4 to 6, the first Hall sensor 610 is positioned under the first magnet 400. The first Hall sensor 610 may be disposed along a rotation orbit O1 of the first magnet 400 about a rotation center C of the yoke 300. Three first Hall sensors 610 may be disposed. The three first Hall sensors 610 generate three sensing signals. A controller 1000 of the motor determines a position of the yoke 300 on the basis of the sensing signals generated by the first Hall sensors 610. For example, in a case in which the first magnet 400 has eight poles and three first Hall sensors 610 are provided, an angular unit for measuring rotation is 15° based on one rotation (360°) of the yoke 300. A sensing signal 51 generated by the three first Hall sensors 610 has a pulse waveform for each rotation angle of 15°. However, in the case in which the angular unit for measuring rotation is 15°, it is difficult to precisely measure whether a speed of the motor is constant. Accordingly, whether a speed of the motor is constant is more precisely determined using the second magnet 500 and the second Hall sensor 620.

The second Hall sensor 620 is disposed under the second magnet 500. The second Hall sensor 620 may be disposed along a rotation orbit O2 of the second magnet 500 about a rotation center of the second magnet 500. The second Hall sensor 620 may be disposed outside the first Hall sensor 610 with respect to the rotation center of the yoke 300 in a radial direction. The second Hall sensor 620 may be disposed as a plurality of second Hall sensors 620. Since the second magnet 500 is provided as the plurality of divided magnets, the second Hall sensor 620 generates a sensing signal S2 having a pulse waveform with a period shorter than a period of a sensing signal generated by the first Hall sensor 610. The controller 1000 of the motor may detect whether a rotation speed of the motor is constant on the basis of the sensing signal generated by the second Hall sensor 620. For example, in a case in which the second magnet 500 has 72 poles and two second Hall sensors 620 are provided, an angular unit for measuring rotation is 2.5° based on one rotation (360°) of the yoke 300. Accordingly, since a sensing signal S2 generated by the two second Hall sensors 620 has a pulse waveform for each rotation angle of 2.5°, the number of revolutions per minute of the motor may be checked more precisely.

Figure 7:
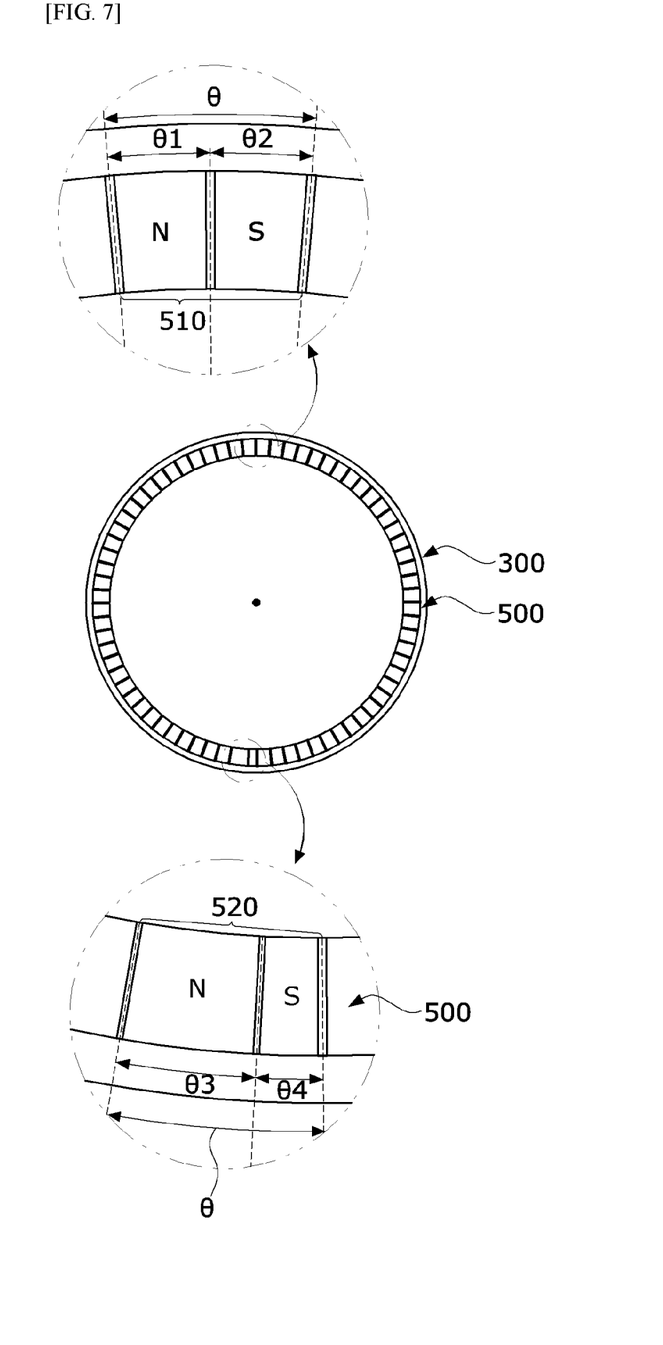
FIG. 7 is a view illustrating a second magnet.

FIG. 7 is a view illustrating the second magnet.

Referring to FIG. 7, the second magnet 500 may include a plurality of divided magnets 510 divided at and distinguished by a first angle Θ in a circumferential direction. Each of the divided magnets 510 may be divided into an N-pole and an S-pole in the circumferential direction. The N-pole of the divided magnet 510 may be divided at and distinguished by a second angle Θ1 in the circumferential direction. In addition, the S-pole of the divided magnet 510 may be divided at and distinguished by a third angle Θ2 in the circumferential direction. In this case, the second angle Θ1 is equal to the third angle Θ2.

In addition, the second magnet 500 may include one index magnet 520. The index magnet 520 is divided at the first angle Θ and distinguished from the plurality of divided magnets 510. The index magnet 520 may be divided into an N-pole and an S-pole in the circumferential direction. The N-pole of the index magnet 520 may be divided at and distinguished by a fourth angle Θ3. In addition, the S-pole of the index magnet 520 may be divided at and distinguished by a fifth angle Θ4 in the circumferential direction. In this case, unlike the divided magnet 510, the fourth angle Θ3 is greater than the fifth angle Θ4 in the index magnet 520. That is, a width of the N-pole of the index magnet 520 is increased in order to generate a pulse which is a reference to detect one rotation (360°) of the yoke 300 of the motor.

Figure 8:
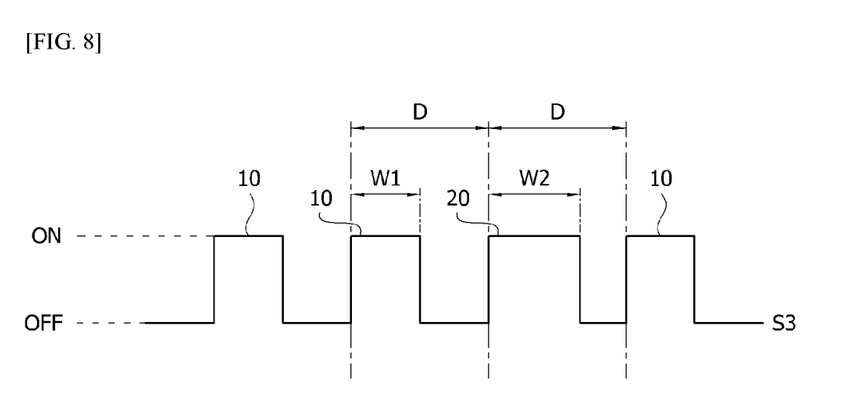
FIG. 8 is a view illustrating a sensing signal.

FIG. 8 is a view illustrating a sensing signal.

Referring to FIGS. 7 and 8, a sensing signal detected by the second Hall sensor 620 is a pulse width modulation (PWM) signal S3. The controller 1000 may output a signal detected by the second Hall sensor 620 as the PWM signal S3 in which a high signal and a low signal are repeated periodically.

For example, in a case in which the second magnet 500 has 72 poles and two second Hall sensors 620 are provided, when the yoke rotates one time, 146 pulses are generated in the PWM signal S3, and among the 146 pulses, 144 first pulses 10 and two second pulses 20 are generated. The first pulses 10 are generated due to the divided magnets 510, and the second pulses 20 are generated due to the index magnet 520. A duty value D of the first pulse 10 and a duty value D of the second pulse 20 are the same. Widths W1 of the first pulses 10 may be the same and a duty cycle thereof may be 50%.

The second pulse 20 is generated when the index magnet 520 passes the second Hall sensor 620. A width W2 of the second pulse 20 is greater than the width W1 of the first pulse 10. This is because a width of the N-pole of the index magnet 520 is greater than a width of the N-pole of the divided magnet 510. In a duty period in which the second pulse 20 is generated, a duty cycle is greater than 50%.

Figure 9:
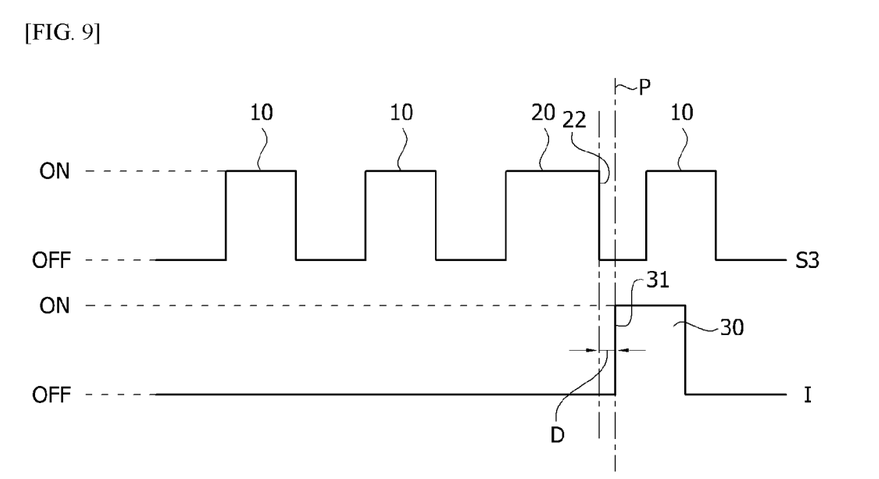
FIG. 9 is a view illustrating a pulse width modulation (PWM) signal and an index signal.

FIG. 9 is a view illustrating a PWM signal and an index signal.

Referring to FIG. 9, the controller 1000 (see FIG. 6) instructs to generate an index signal I at a first time point which is a time point at which a falling edge 22 of the second pulse 20 is detected. In this case, due to an operation process of the controller 1000, the index signal I is generated at a second time point later than the first time point. Accordingly, a value D of FIG. 9, which is a delay value, is generated between the time point at which the falling edge 22 of the second pulse 20 is detected and the time point at which the index signal I is generated. In this case, a reference of the time point at which the index signal I is generated may be a rising edge 31 of a pulse 30 of the index signal I.

The controller 1000 has a preset first time point and a delay value D based on a constant speed condition of the motor. In addition, the controller 1000 has a preset second time point obtained by reflecting a delay value at the preset first time point. Hereinafter, the preset second time point is referred to as a first reference point P. The first reference point P is a reference for calculating a first error B (see FIG. 10) of the index signal I detected by driving the motor.

In this case, a width of a pulse of the index signal I may be the same as the width W1 of the first pulse 10 of the PWM signal.

Figure 10:
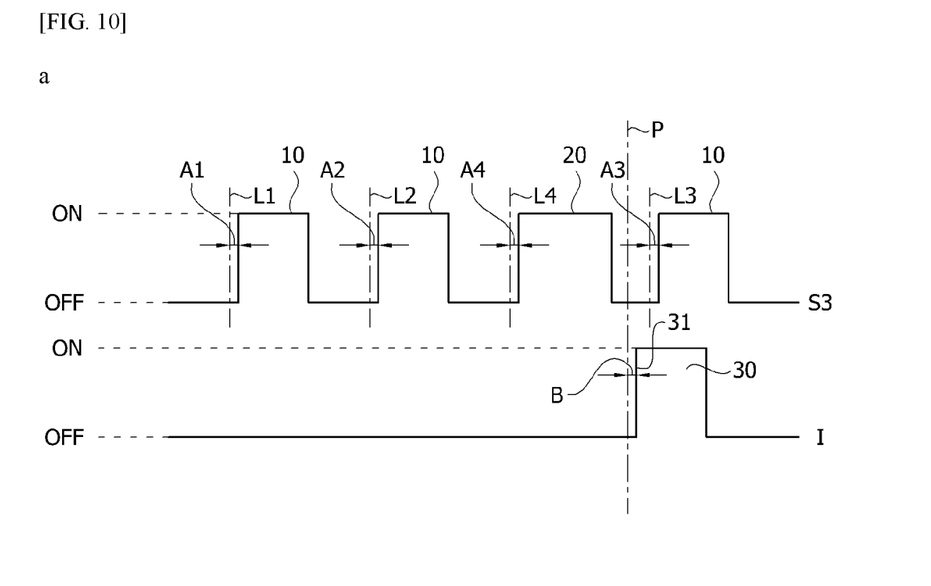
FIG. 10 is a view illustrating the comparison between the index signal and a first reference point and the comparison between the PWM signal and a second reference point.

FIG. 10 is a view illustrating the comparison between the index signal and the first reference point and the comparison between the PWM signal and a second reference point.

Referring to FIG. 10, a point P of FIG. 10 is the first reference point P of the index signal I as described above. When the motor rotates and the falling edge 22 of the second pulse 20 is detected, the controller 1000 generates the index signal I for each rotation. The controller 1000 obtains a first error B by comparing a time point at which the rising edge 31 of the pulse 30 of the index signal I is detected and the first reference point P.

The controller 1000 performs primary feedback control on a speed of the motor to align the rising edge 31 of the pulse 30 of the index signal I with the first reference point P.

Then, the controller 1000 compares the duty value of the PWM signal input in advance based on a constant speed of the motor and the duty value of the PWM signal S3 to obtain second errors A1, A2, A3, and A4 in a state in which the rising edge 31 of the pulse 30 of the index signal I is aligned with the first reference point P. Rising edges of pulses of the PWM signal may be second reference points L1, L2, L3, L4, and the like to obtain the second errors A1, A2, A3, and A4 on the basis of the duty value of PWM signal input in advance.

The motor rotates, and the controller 1000 detects rising edges of the first pulses 10 and the second pulses 20. In addition, the controller 100 compares the rising edges of the detected pulses and the second reference points L1, L2, L3, L4, and the like to obtain the second errors A1, A2, A3, and A4.

The controller 1000 performs secondary feedback control on the speed of the motor to align the rising edges of the pulses of the detected PWM signals 10 and 20 with the second reference points L1, L2, L3, and L4.

As described above, in a case in which the index signal I is generated based on the PWM signal S3, the motor according to the embodiment has an advantage of additionally setting the first reference point P in addition to the second reference points L1, L2, L3, L4, and the like when controlling the speed of the motor using a point at which the index signal I is delayed. Since feedback control is added based on the first reference point P, there is an advantage in which precision of speed control of the motor can be significantly improved when compared to a case in which the second magnet 500 has the same number of poles.

As described above, the motor according to one exemplary embodiment of the present invention has been specifically described with reference to the accompanying drawings.

The above-described embodiments should be considered in a descriptive sense only and not for purposes of limitation, and the scope of the present invention is defined not by the detailed description but by the appended claims. In addition, it should be interpreted that the scope of the present invention encompasses all modifications and alterations derived from meanings and the scope and equivalents of the appended claims.

The invention claimed is:

1. A motor comprising:
a shaft;
a yoke coupled to the shaft;
a stator disposed between the shaft and the yoke;
a first magnet and a second magnet disposed in the yoke; and
a circuit board including a first Hall sensor disposed to correspond to the first magnet, a second Hall sensor disposed to correspond to the second magnet, and a controller,
wherein the second magnet includes a plurality of divided magnets and an index magnet, and
the controller generates an index signal at a second time point delayed from a first time point at which a pulse due to the index magnet is detected among pulses of a pulse width modulation (PWM) signal detected by the second Hall sensor, compares a second time point which is input in advance based on a constant speed condition of the motor and a detected second time point to obtain a first error, compares a duty value, which is input in advance based on the constant speed condition of the motor, of a PWM signal and a duty value of a detected PWM signal to obtain a second error, and controls a speed of the motor on basis of the first error and the second error, wherein:
a width of the each of the plurality of divided magnets and a width of the index magnet are the same;
each of the plurality of divided magnets and the index magnet are formed in a combination of an N-pole and an S-pole;
a width of the N-pole and a width of the S-pole are the same in each of the plurality of divided magnets; and
a width of the N-pole and a width of the S-pole are different in the index magnet.

2. The motor of claim 1, wherein the first time point corresponds to a time point at which a falling edge of a puke, at which a duty cycle is changed, of the PWM signal is detected.

3. A motor comprising:
a shaft:
a yoke coupled to the shaft;
a stator disposed between the shaft and the yoke;
a first magnet and a second magnet disposed in the yoke; and
a circuit board including a first Hall sensor disposed to correspond to the first magnet, a second Hall sensor disposed to correspond to the second magnet, and a controller,
wherein the second magnet includes a plurality of divided magnets and an index ma net and
the controller generates an index signal at a second time point delayed from a first time point at which a pulse due to the index magnet is detected among pulses of a pulse width modulation (PWM) signal detected by the second Hall sensor, compares a second time point which is input in advance based on a constant speed condition of the motor and a detected second time point to obtain a first error, compares a duty value, which is input in advance based on the constant speed condition of the motor, of a PWM signal and a duty value of a detected PWM signal to obtain a second error, and controls a speed of the motor on basis of the first error and the second error,
wherein the second time point corresponds to a time point at which a rising edge of the pulse of the index signal is detected while the PWM signal is in an off state.

4. The motor of claim 1, wherein the controller detects and compares a rising edge of the pulse of the PWM signal to obtain the second error.

5. The motor of claim 1, wherein the controller performs feedback control so that:
the second time point input in advance is the same as the detected second time point; and
the duty value, which is input in advance, of the PWM signal is the same as the duty value of the detected PWM signal.

6. The motor of claim 1, wherein a width of the pulse of the PWM signal is the same as a width of the pulse of the index signal.

7. The motor of claim 1, wherein a duty cycle is 50% in a duty period except for a duty period in which the first time point is present among duty periods of the PWM signal.

8. The motor of claim 7, wherein a duty cycle is more than 50% in the duty period in which the first time point is present among the duty periods of the PWM signal.

* * * * *